Dec. 12, 1933.   E. C. FRITTS   1,939,209
PROJECTION APPARATUS
Filed Feb. 16, 1933
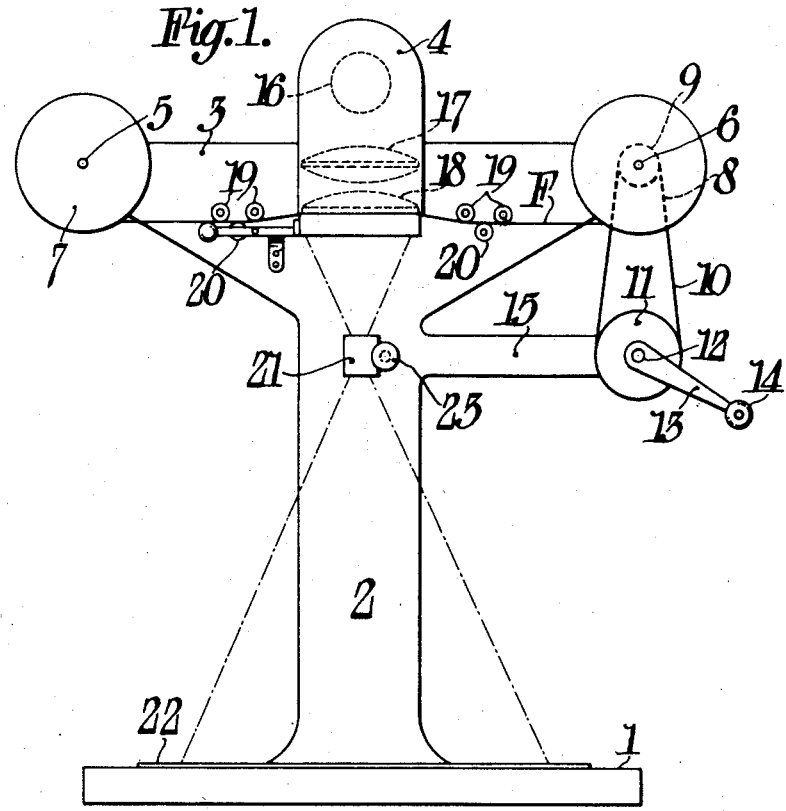
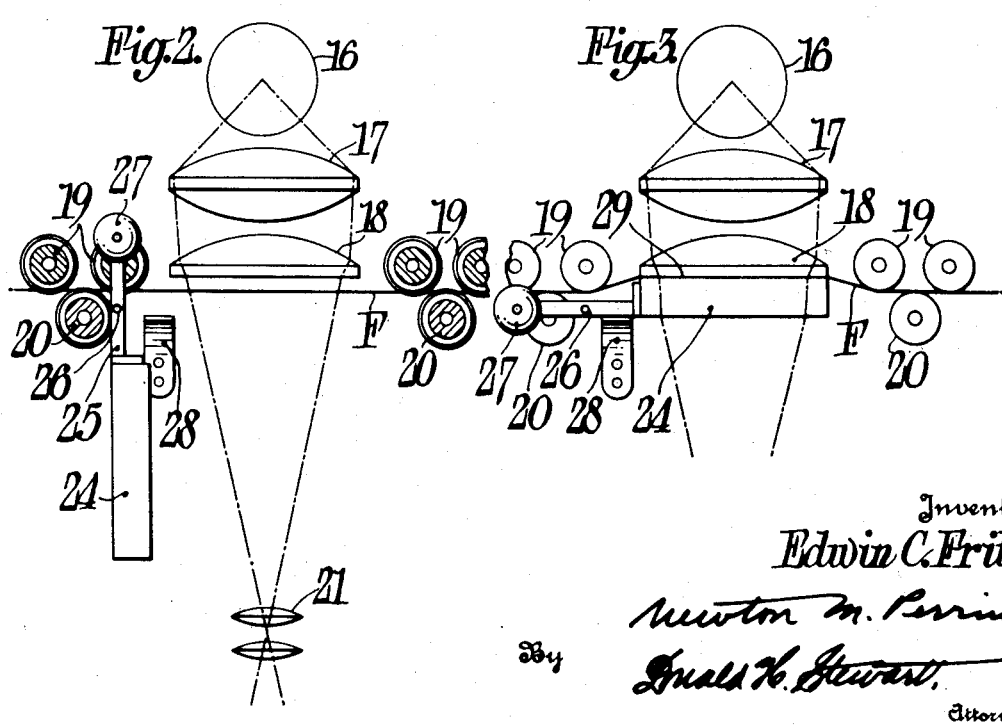
Inventor:
Edwin C. Fritts,
By Newton M. Perrins,
Donald H. Stewart,
Attorneys Patented Dec. 12, 1933

1,939,209

UNITED STATES PATENT OFFICE 1,939,209

PROJECTION APPARATUS

Edwin C. Fritts, Rochester, N. Y., assignor to Eastman Kodak Company, Rochester, N. Y., a corporation of New York Application February 16, 1933. Serial No. 656,979

6 Claims. (Cl. 88—24)

This invention relates to photography and more particularly to projection machines for producing enlarged images upon a screen. One object of my invention is to provide a machine in which a long film can be wound through a definite path from which path an objective may produce a sharp image upon a screen of an image carried by the film. Another object of my invention is to provide a film path through which film may be rapidly wound and one in which the film will be supported solely by its edges, and consequently will not have frictional engagement with a film gate. Another object of my invention is to provide a film clamping device for holding a relatively small area of film extremely flat for enlarging or viewing. Another object of my invention is to provide an optical system by which the film will be retained sharply in focus on the screen when in either of two positions without alteration or adjustment of the objective. Another object of my invention is to provide a machine with which any desired frame of a motion picture film may be readily located and with which such a frame may be readily enlarged, and other objects will appear from the following specification, the novel features being particularly pointed out in the claims at the end thereof.

Coming now to the drawing:

Figure 1 is a side elevation of one embodiment of a machine constructed in accordance with my invention.

Figure 2 is a fragmentary detail elevation showing the film passing through one film path for viewing.

Figure 3 is a view similar to Figure 2, but with the film clamped flat in a second path for enlarging or viewing.

As one embodiment of my invention, I have shown in the drawing a machine which may comprise a base 1 from which an upright 2 extends upwardly, this upright terminating in a crosspiece 3 which supports a lamphouse 4 in the center and shafts 5 and 6 at the ends.

Shafts 5 and 6 are adapted to carry film reels 7 and 8, and shaft 6 may be rotated by means of a pulley 9, belt 10, and pulley 11 mounted on a shaft 12. Pulley 11 may be rotated by means of a crank 13 and handle 14, these parts being carried by the shaft 12 which is mounted on an arm 15 of the upright 2.

The lamphouse 4 may enclose a suitable lamp 16 and condenser elements 17 and 18.

In order to provide a film path through which the film may be rapidly drawn without having frictional contact with any stationary member, I provide two series of rollers, an upper set of rollers 19 and lower rollers 20. As indicated in Figure 2, when the film F is drawn through the rollers 19 and 20, it lies in a plane in which an objective 21 forms a sharp image on the screen 22 of an image carried by the film. A suitable mechanism such as a knurled wheel 23 may be used for initially focusing the image of the film as it lies in its first position which is in the path defined by the rollers 19 and 20. With the film passing through this film path, the handle 14 may be turned until the desired frame is in focus on the screen 22. While the film is held satisfactorily flat for this purpose—viewing the film—if the film remains stationary for any length of time, the heat from the lamp 16 may cause the film to bend out of its path. It is desirable, therefore, to clamp the film flat in position when a prolonged examination of the image on screen 22 is to be made, or when an enlargement is to be made.

In order to do this and in order to keep the optical distance from the film to the screen the same, I provide a clamping member 24 in the form of a plate of glass. This clamping member is carried by an arm 25 pivoted at 26 to the upright 2 and having a handle 27 by which it may be swung from the position shown in Figure 2 to that shown in Figure 3.

In order to hold the clamping member 24 in the position shown in Figure 3 any suitable mechanism such as a snap-latch 28 may be employed.

While it is not essential to have two clamping members, since the film will remain satisfactorily flat on the clamping member 24 without an upper clamping member, I have found it convenient to utilize the condensing element 18 as one element of a clamping member, and hold the film F between the plane surface 29 of the condensing element 18 and the clamping block 24.

As above described, the optical distance between the film and the screen in Figures 2 and 3 is the same. In other words, the second position of the film in which it is clamped flat for exposure is spaced from the first position of the film, as indicated in Figure 2, a distance which is sufficient to compensate for the thickness of the glass clamping member 24, that is, since the glass block 24 shortens the optical path, the film is removed from the screen 22 the proper distance to compensate for this shortening of the path.

The operation of my machine is extremely simple. A motion picture film F carried by a suitable supply reel 7 is mounted on the shaft 5 is rapidly threaded between two sets of rollers 19 and 20, and is attached to a take-up reel 8 mounted on the shaft 6. No focusing is necessary, since this machine is of a fixed focus variety.

The operator then turns handle 14, watching the images pass on the screen 22 until the desired image appears. If the film has been previously notched to indicate the desired frame, this initial positioning of the film can be very rapidly done by merely watching for the notch in the edge of the film, but I have found that it is comparatively easy to pick out any desired frame.

During all this winding movement, since the film merely passes between the guide rollers 19 and 20, there is absolutely no tendency to mar or scratch the film through frictional contact with any of the film guideways or film gates. The film may run absolutely free.

When the desired frame has been reached, the operator swings handle 27 from the position shown in Figure 2 to the position shown in Figure 3 until the clamping member 24 is latched in its operative position shown in Figure 3 by the snap-latch 28. In this position the film F is held perfectly flat between two plane members, and an exposure may be made in the usual manner or the examination of the enlargement may be visually made.

Having thus described my invention, what I claim as new and desire to secure by Letters Patent of the United States is:

1. In a projection apparatus, the combination with means for defining a film path, an objective, and a screen on which an image carried by a film and lying in its path may be sharply focused, and a transparent plate for holding a section of the film flat, said plate moving said film from its path a definite distance, the optical distance to the screen from the film in its first position without the plate in position being the same as the optical distance to the screen from the film in its second position including the glass plate.

2. In a projection apparatus, the combination with means for defining a film path, an objective, and a screen on which an image carried by a film and lying in its path may be sharply focused, means for holding a section of the film flat including a movably mounted transparent plate and a fixedly mounted transparent member, said plate moving said film from its path a definite distance, the optical distance to the screen from the film in its first position without the plate in position being the same as the optical distance to the screen from the film in its second position including the glass plate.

3. In a projection apparatus, the combination with means for defining a film path, an objective, and a screen on which an image carried by a film and lying in its path may be sharply focused, a condenser lens having a flat surface on one side of the film path, and means for holding a section of film flat against the flat surface of said condenser including a glass plate movably mounted on the apparatus, said plate moving said film from its path a definite distance, the optical distance to the screen from the film in its first position without the plate in position being the same as the optical distance to the screen from the film in its second position including the glass plate.

4. In a projection apparatus, the combination with means for defining a film path including a plurality of rollers, and constituting a first film positioning means, an objective, and a screen on which an image carried by said film may be sharply focused, and means for clamping film between two transparent members at least one of which is movably mounted constituting a second film positioning means, said second positioning means being the same optical distance from the screen as is the optical distance between the screen and first film positioning means, but lying to one side of the first film positioning means whereby film may be wound through its path without contacting with either of the clamping members.

5. In a projection apparatus, the combination with means for defining a film path including a plurality of rollers, and constituting a first film positioning means, an objective, and a screen on which an image carried by said film may be sharply focused, and means for clamping film between two transparent members at least one of which is movably mounted, and one of which is fixedly mounted, said movable member being adapted to clamp a film area flat on said fixed member and both members constituting a second film positioning means, said second positioning means being the same optical distance from the screen as is the optical distance between the screen and first film positioning means, but lying to one side of the first film positioning means whereby film may be wound through its path without contacting with either of the clamping members.

6. In a projection apparatus, the combination with a plurality of film guiding members defining a film path and constituting a film positioning means, a second film positioning means spaced to one side of the first positioning means and including a movably glass mounted plate adapted to engage said film to move it to a second film position, whereby a film may be passed through the first positioning means entirely out of contact with the second positioning means, a light source, objective, and screen, the optical distance between the film in both positioning means remaining the same.

EDWIN C. FRITTS.